Figure 1:
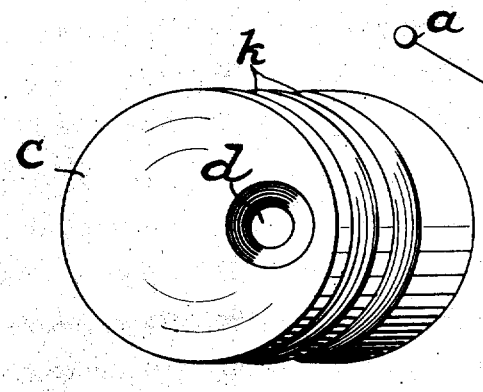

P. C. RAGOTZKY.

DEVICE FOR CONNECTING OUTSIDE WIRES TO BUILDINGS.

APPLICATION FILED MAR. 7, 1917.

Reissued June 5, 1917. 14,312.

WITNESS:

Robt R. Kitchel.

INVENTOR

Philip C. Ragotzky

BY Frank S. Busser

ATTORNEY.

UNITED STATES PATENT OFFICE.

PHILIP C. RAGOTZKY, OF PHILADELPHIA, PENNSYLVANIA.

DEVICE FOR CONNECTING OUTSIDE WIRES TO BUILDINGS.

14,312. Specification of Reissued Letters Patent. Reissued June 5, 1917.

Original No. 1,213,011, dated January 16, 1917, Serial No. 107,741, filed July 6, 1916. Application for reissue filed March 7, 1917. Serial No. 153,215.

*To all whom it may concern:*

Be it known that I, PHILIP C. RAGOTZKY, a citizen of the United States, residing at Philadelphia, county of Philadelphia, and State of Pennsylvania, have invented a new and useful Improvement in Devices for Connecting Outside Wires to Buildings, of which the following is a full, clear, and exact description, reference being had to the accompanying drawings, which form a part of this specification.

The object of my invention is to provide a new and improved means for connecting telephone wires from poles to buildings.

As is well known, a telephone wire is now strung from a pole to porcelain insulators or knobs affixed to the outer wall of the building, whence the wire is carried along such outer wall to one or more other insulators located at the point or points at which the wire enters the house. The pole is usually located at some distance from the house, perhaps directly opposite thereto, but more usually angularly opposite thereto. The ordinary porcelain insulator is of cylindrical shape provided with a central axial orifice and circumferential grooves. It is obvious that the insulator on the building which makes direct connection with the pole must be erected in a vertical position owing to the location of the point on the pole from which the wire is carried. From this insulator the wire is strung to a second insulator located in a horizontal position and screwed direct to the wall. Thence the wire passes to one or more other insulators from which the wire is carried into the interior of the building. The vertically positioned insulator which is directly connected with the pole cannot, of course, be secured direct to the building wall, as if so attached its grooves would not be properly positioned to receive the wire; but the insulator is secured to one arm of an L-shaped bracket, whose other arm must be secured, by at least two screws, to the wall. The erection of this bracket and insulator involves some expense, partly due to the cost of the same, but principally arising from the value of the labor and time involved in their erection and in the tying of the wire thereto.

The object of my invention is to dispense with the necessity of erecting this bracket and extra insulator and to make possible the attachment of the wire leading from the pole direct to an insulator which may be substituted for the one which is now connected to the bracket-supported insulator.

To this end I have provided a new and improved construction of knob or insulator which may be secured direct to the building wall and may be positioned in different ways so that the circumferential grooves therein may be so positioned relative to the wire from the pole as to permit such wire to be attached directly thereto.

Embodiments of my invention are shown in the accompanying drawings, in which—

Figure 4:
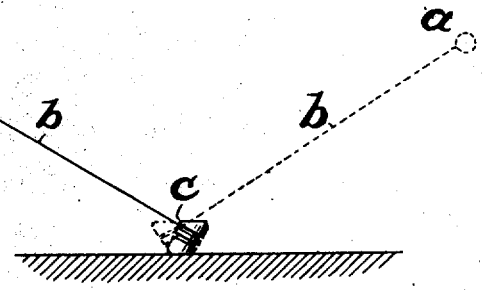
Figure 2:
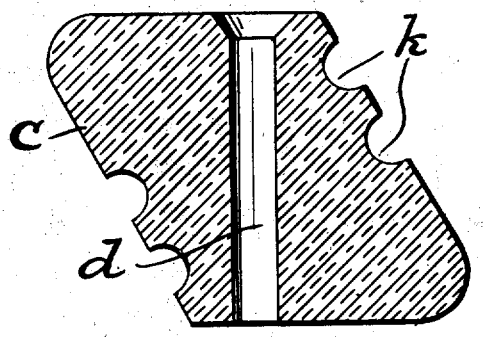
Figure 3:
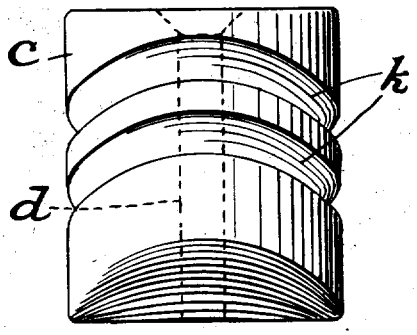
Figure 5:
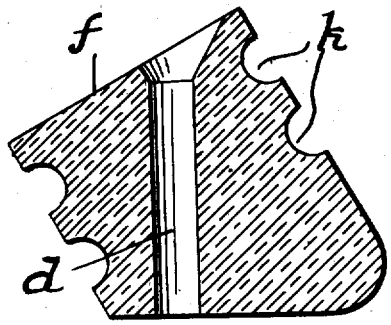

Figure 1 is a plan view of a knob embodying my invention; Fig. 2 is a sectional view of the same; Fig. 3 is an elevation of the same; Fig. 4 is a diagrammatic plan view showing the mode of operation of the invention; and Fig. 5 is a sectional view of a modification.

The insulator *c*, in its preferred form, differs from an ordinary insulator in the following respects: Its end faces extend in planes at an oblique angle to its circumferential wall. Its central hole *d* connecting its end faces extends at an oblique angle to its circumferential wall but perpendicularly to its end walls. These features are not, in their entirety, essential, as will be pointed out hereinafter, but they are desirable, and are deemed to be necessary to accomplish the very best results.

It will be obvious that whatever be the location of the point on the pole *a* from which the wire *b* is strung, the insulator can be so positioned that the circumferential grooves *k* will extend in planes more or less nearly coincident with the direction of extension of the wire from the pole, so as to admit of such wire being directly attached thereto, while at the same time permitting the wire from the insulator to be led direct to one or more other insulators, as heretofore, from which the wire is led to the interior of the building. It is also obvious that if the wire from the pole leads downwardly toward (say) a one-story building, the insulator may be adjusted to readily adapt itself for direct connection more efficiently than if it were erected in a vertical position on a bracket.

The insulator is attachable directly to the wall of a building in the same manner as an ordinary insulator is directly attached thereto, namely, by means of an ordinary screw (not shown) extending through the hole *d*.

It is not essential that both end faces of the insulator shall extend at an oblique angle to its circumferential wall, but only that the orifice extending between the end faces and the end face which is applied to the wall shall each extend at an oblique angle to the planes of extension of the grooves. Thus, the opposite end face may extend in a plane parallel to the planes of extension of the grooves and at a right angle to the circumferential wall, as indicated at *f* in Fig. 5. The construction of Fig. 5, however, is not desirable, because the countersink for the screw head must be made relatively large and also relatively close to the circumferential wall.

It is preferred to provide two sets of insulators, one set in which the angle of inclination of the peripheral wall to the end face is 30 degrees and another set in which such angle is 15 degrees; but it will be understood that the angle of inclination may be varied as described.

It will be appreciated that, by reason of the capacity of my improvement to receive the wire properly at varying angles, the strain or tension on the wire is reduced to a minimum.

Where, in the claims, I specify a knob I do not mean to be confined to a knob made of a single piece except where expressly stated.

Having now fully described my invention, what I claim and desire to protect by Letters Patent is:—

1. A device for attachment to buildings to permit of the direct connection thereto of exterior wires, comprising a circumferentially grooved knob having one end face extending at an oblique angle to the plane of extension of the circular groove and provided with an orifice extending between the end faces at an oblique angle to the plane of extension of the groove.

2. A device for attachment to buildings to permit of the direct connection thereto of exterior wires, comprising a circumferentially grooved knob having parallel end faces extending at an oblique angle to the plane of extension of the circular groove and provided with an orifice extending between, and substantially perpendicular to, both end faces.

3. A device for attachment to buildings to permit of the direct connection thereto of exterior wires, comprising a circumferentially grooved knob having one end face extending at an oblique angle to the longitudinal direction of extension of the circular grooved face and provided with an orifice extending between the end faces, and perpendicular to the obliquely extending end face.

4. A device for attachment to buildings to permit of the direct connection thereto of exterior wires, comprising an integral circumferentially grooved knob having its end faces extending in parallel planes at oblique angles to the direction of longitudinal extension of the circular grooved face and provided with an orifice extending between said end faces at right angles thereto for the reception of a securing screw.

In testimony of which invention I have hereunto set my hand, at Philadelphia, Pennsylvania, on this 3rd day of March, 1917.

PHILIP C. RAGOTZKY.